US011915304B2

(12) United States Patent
Ostfeld

(10) Patent No.: US 11,915,304 B2
(45) Date of Patent: Feb. 27, 2024

(54) DATABASE, DATA STRUCTURES, AND DATA PROCESSING SYSTEM FOR SATISFYING A REQUEST FOR LOCALLY-SOURCED PRODUCTS

(71) Applicant: Rosemary Ostfeld, East Lyme, CT (US)

(72) Inventor: Rosemary Ostfeld, East Lyme, CT (US)

(73) Assignee: Rosemary Ostfeld, East Lyme, CT (US)

( * ) Notice: Subject to any disclaimer, the term of this patent is extended or adjusted under 35 U.S.C. 154(b) by 376 days.

(21) Appl. No.: 17/170,264

(22) Filed: Feb. 8, 2021

(65) Prior Publication Data

US 2021/0272186 A1 Sep. 2, 2021

Related U.S. Application Data

(60) Provisional application No. 62/983,746, filed on Mar. 1, 2020.

(51) Int. Cl.
*G06Q 30/00* (2023.01)
*G06Q 30/0601* (2023.01)
(Continued)

(52) U.S. Cl.
CPC ......... *G06Q 30/0639* (2013.01); *G06F 16/22* (2019.01); *G06F 16/9537* (2019.01); *G06Q 10/087* (2013.01)

(58) Field of Classification Search
CPC .. G06Q 30/0639; G06Q 10/087; G06F 16/22; G06F 16/9537
See application file for complete search history.

(56) References Cited

U.S. PATENT DOCUMENTS 4,797,818 A 1/1989 Jeffrey
5,487,276 A 1/1996 Namisniak et al.
(Continued)

OTHER PUBLICATIONS

"Healthy Planeat: A Social Venture Towards a Sustainable Future," Deeter-Loeb, Hannah. University Wire [Carlsbad] Nov. 15, 2019; Dialog #2314464598 2pgs. (Year: 2019).*
(Continued)

*Primary Examiner* — Robert M Pond
(74) *Attorney, Agent, or Firm* — Fish & Richardson P.C.

(57) ABSTRACT

Methods, systems, and apparatuses, including computer programs, for satisfying a request for locally-sourced products. In one aspect, the method can include obtaining a request for a locally-sourced product that includes (i) data describing a product and (ii) a location of the user of the user device, identifying a first set of locally-sourced product records from a locally-sourced product database that are responsive to the request for the locally-sourced product, determining a subset of the first set of locally-sourced product records based on (i) a second location of a provider of the product and (ii) one or more other product attributes including a product quantity available to the provider, and fulfilling, using a locally-sourced product fulfillment engine, the request for locally-sourced product from multiple different locally-sourced providers based on the determined subset of the first set of locally-sourced product records.

18 Claims, 3 Drawing Sheets

(51) Int. Cl.
*G06Q 10/087* (2023.01)
*G06F 16/22* (2019.01)
*G06F 16/9537* (2019.01)

(56) References Cited

U.S. PATENT DOCUMENTS

| | | | |
|---|---|---|---|
| 5,504,589 A | 4/1996 | Montague et al. | |
| 10,977,751 B1* | 4/2021 | Bernstein | G06Q 10/0832 |
| 2013/0013454 A1* | 1/2013 | Sears | G06Q 10/06 |
| | | | 705/26.41 |
| 2014/0279714 A1* | 9/2014 | Gendloff | G06Q 90/00 |
| | | | 705/500 |
| 2015/0287084 A1* | 10/2015 | Gura | G06Q 30/0261 |
| | | | 705/14.58 |
| 2017/0255903 A1* | 9/2017 | Chowdhry | G06Q 10/0833 |
| 2021/0192648 A1* | 6/2021 | Bernstein | G06Q 50/12 |

OTHER PUBLICATIONS

"Healthy PlanEat: Middletown business brings just-picked produce to pop-up locationpicked location," Cassandra Day Updated: Nov. 4, 2019 8:35 p.m.; 8 pgs. (Year: 2019).*

"App-to-table East Lyme native wants to let you order fresh, locally grown items right from your smartphone," Hartford Courant [Hartford, Conn] Feb. 2, 2020: B.1 .; Dialog #2349611873 2pgs. (Year: 2020).*

"Healthy PlanEat" Creates App for CT Shoppers to Order Ingredients from Local Farmers . . . Help Them Rais $$, CTbites, Jan. 28, 2020; 2pgs. (Year: 2020).*

* cited by examiner

DATABASE, DATA STRUCTURES, AND DATA PROCESSING SYSTEM FOR SATISFYING A REQUEST FOR LOCALLY-SOURCED PRODUCTS

CROSS-REFERENCE TO RELATED APPLICATIONS

This application claims the benefit of U.S. Provisional Patent Application No. 62/983,746 filed on Mar. 1, 2020, which is incorporated herein by reference in its entirety.

BACKGROUND

The Internet has made e-commerce an integral part of everyday life. Currently, people, businesses, and governmental entities around the globe make purchases of goods and services from vendors via the Internet. Historically, such buyers of goods and services via the Internet are not concerned with and do not specify where their goods and services originate—so long as the buyer gets the goods or services the buyer seeks.

SUMMARY

According to one innovative aspect of the present disclosure, a method for satisfying a request for locally-sourced products is disclosed. In one aspect, the method can include actions of obtaining, by one or more computers and from a user device, a request for a locally-sourced product that includes data describing (i) a product and (ii) a location of the user of the user device, identifying, by one or more computers, a first set of locally-sourced product records from a locally-sourced product database that are responsive to the request for the locally-sourced product, determining, by one or more computers, a subset of the first set of locally-sourced product records based on (i) a second location of a provider of the product and (ii) one or more other product attributes including a product quantity available to the provider, and fulfilling, by one or more computers executing a locally-sourced product fulfillment engine, the request for locally-sourced product from multiple different locally-sourced providers based on the determined subset of the first set of locally-sourced product records.

Other versions include corresponding systems, apparatus, and computer programs to perform the actions of methods defined by instructions encoded on computer readable storage devices.

These and other versions may optionally include one or more of the following features. For instance, in some implementations, determining a subset of the first set of locally-sourced product records based on (i) a second location of a provider of the product and (ii) one or more other product attributes including a product quantity available to the provider can include: identifying, by one or more computers, a particular subset of locally-sourced product records that each include one or more fields structuring data that represents (i) a second location of the provider of the product that is within a predetermined distance of the location of the user of the user device and (ii) a quantity of the product that is greater than zero.

In some implementations, the request for the locally-sourced product further can include an availability of the user to collect the locally-sourced product and the one or more other product attributes can also include an availability of the provider of the product to provide the locally-sourced product to the user. In such implementations, determining the subset of the first set of records based on (i) a second location of a provider of the product and (ii) one or more other product attributes can include identifying, by one or more computers, a particular subset or locally-sourced provider records that each include one or more fields structuring data representing (i) a second location of the provider of the product that is within a predetermined distance of the location of the user of the user device, (ii) a quantity of the product that is greater than zero, and (iii) an availability of the provider that corresponds to an availability of the user.

In some implementations, fulfilling the request for locally-sourced product from multiple different locally-sourced providers based on the determined subset of first set of locally-sourced product records can include identifying, by one or more computers, a first locally-sourced provider record from the subset of the first set of locally-sourced product records having a first locally-sourced provider location closest in proximity to the location of the user, and using, by one or more computers, locally-sourced product inventory of the first locally-sourced provider associated with the identified locally-sourced provider record to fulfill the request for the locally-sourced product until (i) the locally-sourced product inventory of the first locally-sourced provider is exhausted or (ii) a quantity of locally-sourced product requested by the request is satisfied.

In some implementations, the method can further include determining, by one or more computers and during fulfillment of the request for the locally-sourced product, that the locally-sourced product inventory of the locally-sourced provider is exhausted, and based on a determination that the locally-sourced product inventory of the locally-sourced provider is exhausted: identifying, by one or more computers and during fulfillment of the request for the locally-sourced product, a second locally-sourced product provider record having a location of a second locally-sourced product provider that is a next-closest location to the location of the user device after the location of the first locally-sourced product provider of the first locally-sourced provider record, and using, by one or more computers, locally-sourced product inventory of the locally-sourced provider associated with the identified second locally-sourced provider record to fulfill the request for the locally-sourced product until (i) the locally-sourced product inventory of the second locally-sourced provider is exhausted or (ii) a quantity of locally-sourced product requested by the request is satisfied.

These and other innovative features are described below in the detailed description, the drawings, and in the accompanying claims.

DETAILED DESCRIPTION

Systems, methods, and computer programs of the present disclosure are directed towards a satisfying a request for locally-sourced products. In one aspect, a virtual storefront can be provided for display on a user device that enables a user of the user device to submit orders for locally-sourced products. The virtual storefront can function as an interface between a user and a locally-sourced product database. A user can submit, via the virtual storefront, a request for locally-sourced products to a locally-sourced product search engine. The search engine can execute the request against the locally-sourced product and provide the search results to a locally-sourced product request fulfillment engine. The locally-sourced product search engine can function as a dynamic database filter that can be used to filter the records of the locally-source product database 150 in order to identify a subset of locally-soured product records for downstream processing by the locally-sourced product request fulfillment engine.

The present disclosure provides multiple technical advantages. For example, using the locally-sourced product request fulfillment engine to reduce the number of records set for downstream processing reduces the processing power expended during downstream processing operations. Reduction in downstream processing also reduces overall runtime of the data processing system. In addition, the present disclosure optimizes the interface between a user and the locally-sourced product database by fulling request for locally-soured products from multiple different product vendors in response to a single request. In some implementations, a user may not even know that the locally-sourced product search and fulfillment system is being employed. Moreover, the present disclosure provides tangible benefits to local business owners by ensuring that distribution of their products of their products occurs to the local community and that that their inventory is optimized. A "locally-sourced product" can include a product that is offered, by a vendor, for sale or lease within a predetermined distance of the vendor's geographic location.

Figure 1:
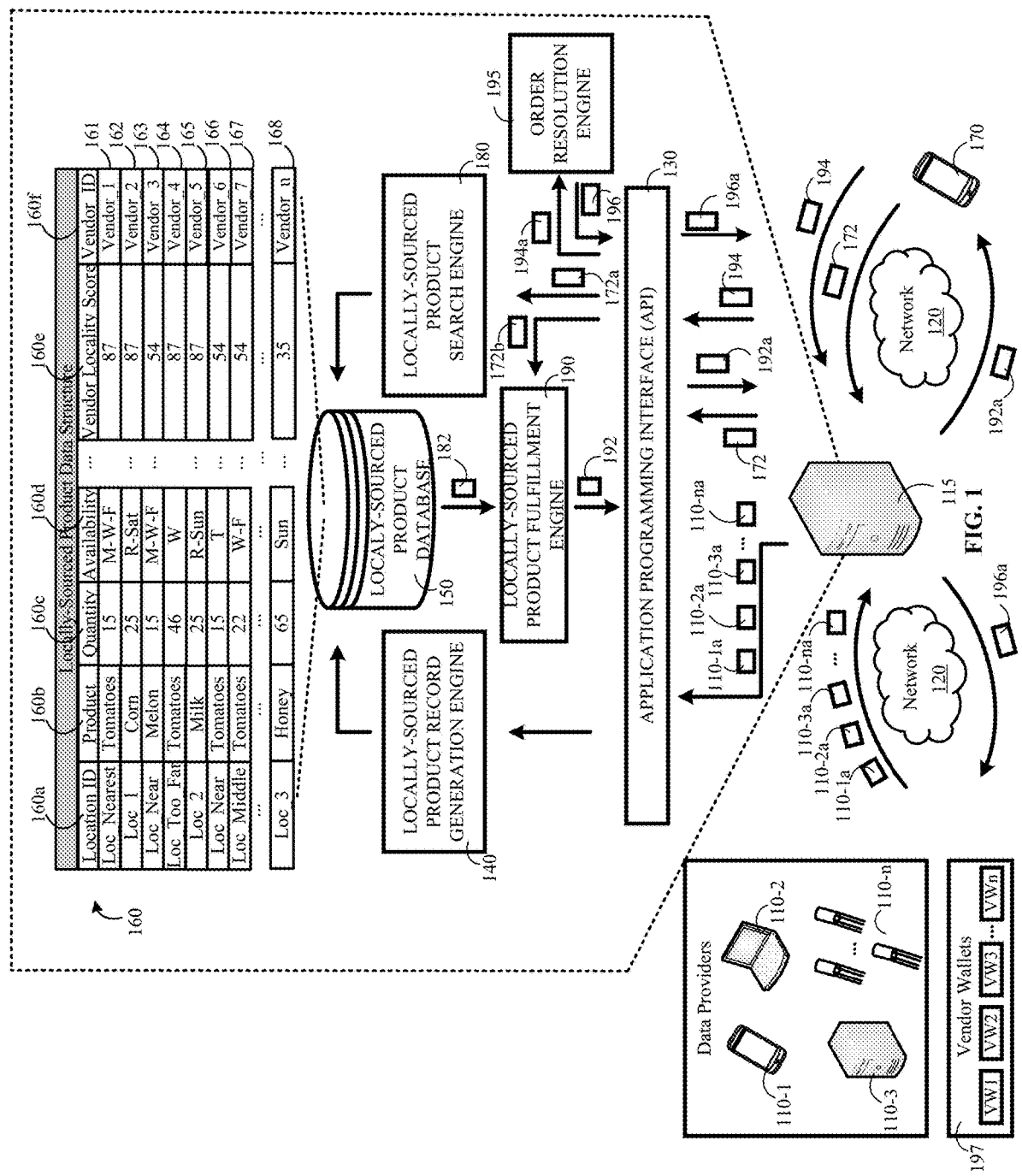
FIG. 1 is a contextual diagram of an example of a data processing system for satisfying a request for locally-sourced products.

FIG. 1 is a contextual diagram of an example of a data processing system 100 for satisfying a request for locally-sourced products. The data processing system 100 can include one or more data providers 110-1, 110-2. 110-3, 110-n (where "n" is any positive integer greater than zero), one or more application servers 115, one or more networks 120, an application programming interface (API) 130, a locally-sourced product record generation engine 140, a locally-sourced product database 150, a locally-sourced product search engine 180, a locally-sourced product request fulfillment engine 190 (or fulfillment engine 190), and one or more user devices 170. In some implementations, the system 100 can also include an order resolution engine 195 and one or more vendor wallets 197. For purposes of the present disclosure, an "engine" can include one or more software processing modules, one or more hardware processing modules, or any combination thereof. In some implementations, an "engine" can be hosted by a single computer. In other implementations, the "engine" can be distributed across multiple different computers.

The data providers 110-1, 110-2, 110-3, 110-n can include a device that provides data 110-1a, 110-2a, 110-3a, 110-na describing inventory of a locally-sourced product vendor to the application server 115. Examples of data providers 110-1, 110-2, 110-3, 110-n can include a smartphone or tablet 110-1, a laptop or desktop computer 110-2, a server computer 110-3, or sensors 110-n such as RFID sensors. Data providers 110-1, 110-2, 110-3, 110-n can provide data 110-1a, 110-2a, 110-3a, 110-na describing inventory of a locally-sourced product to the application server 115 either directly or indirectly. Data 110-1a, 110-2a, 110-3a, 110-na describing the inventory of a locally-sourced product can include a location ID, a product ID, a quantity indicator, availability of the vendor to provide the locally-sourced product, or any combination thereof.

For example, in some implementations, a vendor can use a user device 110-1 or computer 110-2 to access a portal that is hosted, e.g., by the application server 115 and use the portal to upload data describing inventory of the vendor's locally sourced product to the application server 115 using one or more networks 120. The network 120 can include a LAN, a WAN, a wireless network, a wired network, a cellular network, the Internet, or any combination thereof. In some implementations, sensor(s) 110-n can be affixed to locally-soured products or a container storing one or more locally-soured products and then used to transmit data describing inventory of the locally-sourced products to the application server 115. In some implementation, the sensor (s) 110-n can transmit data describing inventor of the locally-sourced products of a vendor without vendor instruction to transmit the data.

In other implementations, one or more data providers 110-1, 110-2, 110-3, 110-n may be configured to provide data 110-1a, 110-2a, 110-3a, 110-na indirectly. For example, in some implementations, a data provider such as a sensor 110-n can broadcast data describing inventory of a locally-sourced product and the broadcasts data can be detected by another data providers such as a server 110-3. In such implementations, the other data provider such as the server 110-3 can then relay the detected inventor data for the locally-sourced product to the application sever 215 using one or more networks 120.

The application server 115 can receive the data 110-1a, 110-2a, 110-3a, 110-na describing the locally-sourced products via the network 120 using an application program interface 130. In some implementations, such as the depicted implementation in FIG. 1, the API 130 can function as middleware interface between the application server 115 and one more other devices such as the data providers 110-1, 110-2, 110-3, 110-n or user device 170. In such implementations, data received by the application server 115 and output by the applications server 115 is received using the API 130 and output using the API 130. In such implementations, the API 130 can perform formatting operations that format the received data 110-1a, 110-2a, 110-3a, 110-na into a format for processing by the application server 115 after the data 110-1a, 110-2a, 110-3a, 110-na is received. Likewise, the API can convert the output data into a format for transmission to another device such as the user device 170 or one or more data providers 110-1, 110-2, 110-3, 110-n. However, in other implementations, there is no requirement that all data received by the application server 115 or output by the application server 115 be processed through the API 130. Though the application server 115 is depicted as a single computer, the present disclosure need not be so limited. Instead, the application server 115 can include multiple computers.

The application server 115 can process the data 110-1a, 110-2a, 110-3a, 110-na and provide the processed data 110-1a, 110-2a, 110-3a, 110-na as an input to the locally-sourced product record generation engine 140. In some implementations, processing of the data 110-1a, 110-2a, 110-3a, 110-na can include using middleware such as the API 130 to decompress the data 110-1a, 110-2a, 110-3a, 110-na. In other implementations, processing the data 110-1a, 110-2a, 110-3a, 110-na can include removing data such as headers of data packets used to transmit the data 110-1a, 110-2a, 110-3a, 110-na from the data 110-1a, 110-2a, 110-3a, 110-na in order to make the data 110-1a, 110-2a, 110-3a, 110-na suitable for processing by the locally-sourced product record generation engine 140. The data 110-1a, 110-2a, 110-3a, 110-na can include any data about a locally-sourced product including, but not limited to, a location identifier indicating where the locally-sourced product identified by, e.g., the data 110-1a is located, a product type identifier, a quantity of the product type at the location, or the like.

In some implementations, the data 110-1a, 110-2a, 110-3a, 110-na can include metadata about a vendor at the location corresponding to the location identifier. Such metadata can include, e.g., availability of a vendor at the location, a vendor locality score, or the like. In other implementations, one or more types of these types of metadata may be received by the locally-sourced product database for a particular vendor at a particular location via one or more other sources. For example, in some implementations, metadata such as the vendor's availability may be input via a vendor's user device 110-1 using a locally-sourced product web portal. In other implementations, metadata such as the vendor's locality score may be obtained from one or more rating services, user feedback services, or the like.

The locally-sourced product record generation engine 140 can process the received data 110-1a, 110-2a, 110-3a, 110-na and generate a locally-sourced data structure 160 for storage into the locally-sourced product database 150. Processing the data 110-1a, 110-2a, 110-3a, 110-na can include processing the data 110-1a, 110-2a, 110-3a, 110-na into individual data records 161, 162, 163, 164, 165, 166, 167, 168 of the locally-sourced product data structure 160. The locally-sourced data structure 160 is a data structure that logically relates data parameters corresponding to a locally-sourced product in a manner that facilitates fulfillment of requests for locally-sourced products as described herein. In some implementations, these data parameters of locally-sourced products can include a location identifier 160a, a product type 160b, a quantity 160c of the product type 160b at the location 160a, availability of the vendor of the product type 160b at location 160a to provide the product type 160b, a vendor locality score 160e, and a vendor ID 160f. These data parameters are functionally interrelated to each other so as to create a locality-based index of locally-sourced products searchable by the locally-sourced product search engine 180.

To generate the data records 162, 163, 164, 165, 166, 167, 168, the locally-sourced product record generation engine 140 is configured to identify and extract data from the received data 110-1a, 110-2a, 110-3a, 110-na that corresponds to each of the fields 160a, 160b, 160c, 160d, 160e, 160f of the locally-sourced product data structure 160. The locally-sourced product record generation engine 140 can be configured to determine whether the data 110-1a, 110-2a, 110-3a, 110-na includes first data corresponding to an initial reporting of a particular product type at a particular location. Based on a determination, by the locally-sourced product record generation engine 140 of an initial occurrence of a particular product type at a particular location, the locally-sourced product record generation engine 140 can generate a new record 161, 162, 163, 164, 165, 166, 167, 168. For example, the locally-sourced product record generation engine 140 can detect an initial occurrence of data 110-1a that indicates that a particular location 160a has just started reporting availability of tomatoes. In such a scenario, the locally-sourced product record generation engine 150 can generate the record 161.

The locally-sourced product record generation engine 140 can then determine whether subsequently received data 110-2a corresponds to (i) a new locally-sourced product type at the same location or a different location or (ii) to an already existing product type at an already known location. If the subsequently received data 110-2a corresponds to a new locally-sourced product type at the same location as the location of record 161 or a different location, then the locally-sourced product record generation engine 140 can generate another row such as row 162. Alternatively, if the subsequently received data 110-2a corresponds to an already existing product type at an already known location, then the locally-sourced product record generation engine 140 can update the quantity 160c of a product type 160b at the already known location 160a based on quantity information included in the received data 110-2a. This process can iteratively continue on each data item 110-1a, 110-2a, 110-3a, 110-na received by the application server 115 and be used to generate the data structure 160 of the locally-sourced product database 150.

A user, e.g., an individual or person representing a group or a wholesale buyer, can use a user device 170 to generate and submit requests 172 for locally-sourced products. In some implementations, the request 172 for locally-sourced products can be generated using a graphical user interface (GUI) of a locally-sourced product web portal accessed via a mobile browser, a locally-sourced product mobile application, or the like. In some implementations, a user of the user device 170 may be presented with a login display that prompts the user to log into the user's account using, for example, an authentication code, a user-defined user identifier, password, or any combination thereof. In other implementations, the GUI may not be required to initially prompt the user with a login display because logging into a user account may not be required, may have previously occurred, or the like. The user can set one or more parameters that can be used to generate an initial filter of locally-sourced products for display via the GUI.

The one or more parameters for initial products can include a geographic location for locally-sourced products, one or more types of locally-sourced products of interest to the user, one or more product categories of interest to the user, or the like. The geographical location may be input, or otherwise determined, in a number of different ways. For example, the user device 170 may determine a user's location using GPS of the user device 170. Alternatively, or in addition, the user may input data describing the user's location. The input data describing the user's location can include an address, a zip code, city, state, or any combination thereof.

In some implementations, the GUI can provide visualizations for display that corresponds to one or more locally-sourced products. In some implementations, the one or more locally-sourced products selected for display via the GUI can based on the location data of the user, other parameters such as types of locally-sourced products or categories of products stored in a user profile, or a combination thereof. In some implementations, types of locally-source products can include, for example, a type of tomato, a type of corn, a type of melon, a type of milk, a type of honey, a type of beef, or any other product that is locally grown, locally raised, locally made, or locally for sale or lease. In some implementations, a category of locally-sourced products can include, for example, vegetables, fruits, meats, dairy, or the like. Though examples of locally-sourced products are described here as food items, the present disclosure is not so limited. For example, in some implementations, a locally-sourced item can include products made or assembled by a local person, company, or other entity, where "local" is defined as being within a predetermined distance from the location of the user of the user device 170. These other local products need not be food items and can include, for example, blankets, shirts, sweaters, paintings, woodwork, pottery, electronics, or the like.

In some implementations, a request 172 for a locally-sourced products can be initiated by the user using the GUI displayed on the user device 170. This can include, for example, selecting a locally-sourced product corresponding to one of the displayed visualizations. For example, in some implementations, the user of the user device 170 may be interested in locally-sourced tomatoes. In such implementations, a visualization of a tomato may be visualized in a GUI displayed in the display of the user device 170. One or more input controls may be associated with each visualization. Input controls can include, for example, a text box, a drop-down selection box, radio buttons, a submit button, the like, or any combination thereof. A user can manipulate the input controls to select a type of locally-sourced product, a number of locally-sourced products the user would like to acquire, an availability of the user to obtain the locally-sourced products, a location of the user device 170, or a combination thereof. The availability of the user can be a date, time, or both.

In some implementations, quantity data may be displayed in a vicinity of the product visualization and display a numerical value indicating an inventory of locally-sourced products in the vicinity of the user of the user device 170. This quantity data can dynamically update based on the location of the user, which as the user's locations changes, would cause a change in the quantity and types of locally-sourced products available to the user. The user device 170 can be configured to deny a request for a user for more locally-sourced products than a number of locally-sourced products indicated by the quantity data for a type of locally-sourced products. In some implementations, the quantity can be dynamically defined by summing the quantity 160c for a particular type of product for each record 161, 162, 162, 164, 165, 166, 167 that have current location 160a that is within a threshold distance of the location of the user device 172. By way of example and with reference to FIG. 1, the quantity of locally-sourced tomatoes available to the user of the user device 170 is 52 tomatoes. In this example, this quantity of tomatoes is distributed across three different vendors. Moreover, in this example, the 46 tomatoes of row 46 are not included in the quantity as the row 164 corresponds to a vendor that is located more than at threshold distance away from the user of the user device 170.

Accordingly, in some implementations the user of the user device 170 can define parameters of a locally-sourced product request 172 by manipulating the input controls. For example, the user can identify a type of locally-sourced product the user wants to acquire, manipulate the input controls by inputting a value representing a quantity into a quantity text box or selecting using a drop-down box or radio button, and then inputting data indicating a user's availability to obtain the quantity of locally-sourced products. By way of example, in one example, a user of the user device 170 can submit a request for 23 locally-sourced tomatoes on a Wednesday. Then, in response to selection of an input control such as a submit button, the user device 170 can generate and transmit one or more data structures that include one more fields structure data that defines parameters of a request for locally-sourced products 172 to the application server 115.

However, the present disclosure is not limited to defining the parameters of a request for locally-sourced products via a manipulation of input controls via a GUI. Instead, in some implementations, a user input a text query into a field of the user interface defining a locally-sourced product type, a locally-sourced product quantity, an availability, or any combination thereof and then instruct the user device 170 to generate and transmit one or more data structures that include one more fields structure data that defines parameters of a request for locally-sourced products 172 to the application server 115.

The application server 115 can receive the request 172 for locally-sourced products generated and transmitted by the user device 170 via the network 120. The network 120 can include one or more wired networks, one or more wireless networks, one or more WANs, one or more LANs, one or more cellular networks, the Internet, or any combination thereof. In some implementations, the request 172 for locally-sourced products can be received by the application programming interface (API) 130. In such implementations, the API 130 can perform one or more processing operations on the received request 172 for locally-source products in order to prepare inputs to downstream processing modules used to facilitate locally-sourced product search and fulfillment.

For example, in some implementations, the API 130 can process the request 172 for locally-sourced products and generate a first input to a locally-sourced product search engine 180 and a second input to a fulfillment engine 190. The first input generated by the API 130 based on the API 130 processing the request 172 for locally-sourced products can be a search query 172a. The search query 172a can include one or more search parameters that include a first subset of the locally-sourced product parameters extracted from the request 172. In some implementations, the search parameters may include a product type. In some implementations, the product type include a product identifier. However, in other implementations, other locally-sourced product parameters can be extracted from the request 172 for addition to the query 172a as a search parameter.

The second input generated by the API 130 based on the API 130 processing the request 172 is data that is used by the fulfillment engine 190 to execute fulfillment operations on a set of search results 182. In some implementations, the second input generated by the API 130 can include data indicating a location of the user device 170, the quantity of locally-sourced products requested, the availability of the user of the user device 170, or any combination thereof. This second input can be obtained, by the API 130, from the request 172 for locally-sourced products. The search results 182 processed by the fulfillment engine 190 can be search results that are obtained by the application server 115 as a result of the locally-sourced product search engine 180 executing the search query 172a against the locally-sourced product database 150.

The locally-sourced product search engine 180 can execute the search query 172a against the locally-sourced product database 150. The locally-sourced product search engine 180 can identify each of the records 161, 162,163, 164, 165, 166, 167, 168 that satisfy the search query 172a. In some implementations, a record 161, 162, 163, 164, 165, 166, 167, 168 can satisfy the search query 172a if the record includes a product data field having a value such as a product type such as a product identifier that matches the product type parameter of the search query 172. However, in other implementations, the query 172a may include other search parameters and, in such implementations, a record 161, 162, 163, 164, 165, 166, 167, 168 can satisfy the search 172a if the record includes a value in a data filed that matches a value of a corresponding parameter type in the search query 172a. A set of search results 182 can be generated based on execution of the search query 172a. The search results 182 can include the set of records 161, 162, 163, 164, 165, 166, 167, 168 that satisfy the search query 172a. The search results 182 can be provided as an input to the fulfillment engine 190.

The fulfillment engine 190 can use the second input 172b to identify the vendors whose locally-sourced products will be used to fulfill the request 172 for locally-sourced products. In the example of a request for 23 tomatoes, the search results 182 can include vendor records 161, 164, 166, 167, as those records satisfy the search query 172a for a product type of "tomatoes." The fulfillment engine 190 can execute fulfillment operations to select subset of the vendor records 161, 164, 166, 167 of the search results 182 based on the set of locally-sourced product parameters included in the second input 172b. In this example, the locally-sourced parameters included in the second input 172b include a location of the user device 170 and the availability of the user, which in this example is a Wednesday.

In some implementations, the fulfillment engine 190 can select the subset of the vendor record 161, 164, 166, 167 that correspond to a vendor that can fulfill the request 172 based on the location of the user device 170 and the availability of the user. In some implementations, the fulfillment engine 190 an prioritize the location of the user device 170 parameter first to identify the vendor that is closest to the user device 170 and then determine whether the availability of that vendor satisfies the constraint of the user's availability. The fulfillment engine 190 can iteratively evaluate each of the vendor records 161, 164, 166, 167 until the user's request 172 for 23 tomatoes on Wednesday is satisfied or all the vendor records 161, 164, 166, 167 in the search results 182 are processed.

If the iterative evaluation of the vendor records 161, 164, 166, 167 is terminated because the quantity of locally-sourced product specified in the request is fulfilled, then the locally-sourced product fulfillment engine 190 can generate output data 192 that identifies the vendors that are to be used to fulfill the request 172 for locally-source products, which in this case is 23 tomatoes on Wednesday. In some implementations, the API 130 can obtain the output data 192 and perform a number of operations to complete the transaction for the locally-sourced product request.

For example, the API 130 can process the output data 192 and generate rendering data 192a that, when rendered by the user device 170, causes the user device 170 to display data indicating that the request 172 for locally-sourced products has been fulfilled. In some implementations, the displayed data may indicate the particular vendors that will fulfill the request 172, a proposed meeting point, date, time, and/or place to facilitate pick-up of the locally-sourced product, fields to prompt for and receive payment information, or any combination thereof.

If the iterative evaluation of the vendor records 161, 164, 166, 167 is not terminated because the quantity of locally-sourced product specified in the request 172 has not been fulfilled, then the locally-sourced product fulfillment engine 190 can generate output data 192 that indicates a quantity of locally-sourced products that the system 100 has identified, the vendors that will fulfill at least a portion of the request 172, a proposed meeting point, date, time, and/or place to facilitate pick-up of locally-sourced products that satisfy at least a portion of the request 172, one or more vendors that are more than a threshold distance away that may be able to fulfill the remaining portion of the request, fields to prompt for and receive payment information, or any combination thereof.

In the example of FIG. 1, the fulfillment engine 190 can iteratively evaluate records 161, 164, 166, 167 in an effort to fulfill the request 172 for 23 locally-sourced tomatoes to be available on Wednesday. In this implementation, the fulfillment engine 190 can prioritize vendors near the user device 170, the fulfillment engine 190 can only select an available quantity of tomatoes from vendors that are less than a threshold distance away from the user device 170 and available. In some implementations, the threshold distance can be predetermined such as, e.g., 40 miles. In other implementations, the threshold distance may be customized by a user to be a distance that the user considers to be "local." Such a threshold distances can be set in a number of different ways including via a number of miles, kilometers, or the like away from the user device 170. However, the present disclosure is not so limited and can be measured other ways such as all vendors within a geographic region such as within the same city, county, state, or the like.

In the example of FIG. 1, the fulfillment engine 190 can determine that vendor_1 of record 161 is within a threshold distance and available on Wednesday. As a result, the fulfillment engine 190 can allocate the 15 available tomatoes from vendor_1 associated with record 161 towards the requested quantity of 23 tomatoes. Next, the fulfillment engine 190 can determine that the vendor record 161 is not within a threshold distance of the user device 170, as the location ID data does not satisfy the predetermined threshold distance. Thus, in this example, though vendor_4 has 46 tomatoes and is available on Wednesday, the fulfillment engine 190 does not allocate any of vendor_4's 46 tomatoes to fill the request 172 for locally-source products because the vendor_4 for too far away from the user device 170, and thus not locally-sourced.

Continuing with the example of FIG. 1, the fulfillment engine 190 can determine that vendor_6 of record 166 is within a threshold distance of the user device 170 and has 15 tomatoes. However, the fulfillment engine 190 can determine to not allocate any tomatoes from vendor_6 because vendor_6 is only available on Tuesdays and not Wednesdays for pickup or delivery. The fulfillment engine 190 can then determine that the vendor_7 of record 167 is within a threshold distance of the user device 170, has 22 tomatoes, and is available on Wednesdays. As a result, the fulfilment engine 190 can allocate 8 of vendor_7's tomatoes towards the requested quantity of 23. In this example, because the termination condition of fulfilling the requested amounted locally-sourced product is met, the iterative evaluation of vendor records can terminate.

In this example, distance was determined by comparing a location of the vendor, which in some implementations may be represented by location information in a field 160a of the locally-sourced database 160, to a predetermined threshold distance from the user device 170. However, there are ways of utilizing the distance of a vendor from the user device 170 in fulfilling requests 172 for locally-sourced products. For example, the fulfillment engine 190 begin evaluating vendor records in an order based on the nearest vendor to the user device 170. In such an implementation, the iterative analysis would begin with record 161, then record 166, then record 167, and then record 164. During each analysis, the fulfillment engine would still consider quantity and availability of vendor, but the order with which the records are considered is different. Such an implementation may ensure that the request for locally-sourced products are fulfilled using locally-sourced products that are closest to the user device 170.

In some implementations there may be scenarios where two or more vendor records are tied as far as distance from the user device 170, availability of the vendor, one or more other parameters, or any combination thereof. In such instances, the application server 115 can select a vendor record of the tied vendor records based on a vendor locality score 160e. The vendor locality score 160e can be based on a number of different factors. For example, in some implementations, the vendor locality score can be based on the number of local orders fulfilled by the vendor. In some implementations, the system 100 can be configured so as to break the tie by selecting the vendor with the highest vendor locality score, indicating that the vendor is a frequent locally-sourced provider. In other implementations, the system 100 can be configured to break the tie by selecting the vendor with the lowest vendor locality score, in an effort to increase the vendor's visibility to local buyers. Though terms such as highest and lowest are used here, the present disclosure is not limited to such implementations, and in some implementations a vendor having the lowest score may provide the most local orders and a vendor having the highest score may provide the least local orders. That is, whether the higher or lower score is indicative of a frequent locally-sourced provider or an infrequent locally-sourced provider is a function of how the equation to calculate the score is designed and does not function to limit the scope of the present disclosure.

The API 130 can format the rendering data 192a for transmission to the user device 170. The application server 115 can transmit the rendering data 192a to the user device 170 using the network 120. The user of the user device 170 can enter payment information into the user device 170 and transmit the payment information 194 to the application server 115. The API 130 can received the payment information 194 and use the order resolution engine 195 to allocate payment to vendor_1 and vendor_7 for the locally-sourced products that they will provide to the user. That is, the order resolution engine 195 can accept inputs 194a that include the vendor_id for each vendor that have locally-sourced products that are committed toward fulfillment of the request 172 for locally-sourced products. In some implementations, the inputs 194a can be determined based on the payment information 194, the output data 192, or a combination thereof. In some implementations, the inputs 194a, such as the vendor_id, can be obtained by executing one or more database searches of the locally-sourced product database 150 based on the payment information 194, the output data 192, or a combination thereof. For example, in some implementations, a search query can be generated based on information in the payment information 194, the output data 192, or both, in order to obtain the requisite vendor_ids. In other implementations, the requisite vendor_ids can be cached by the API, or other component of application server 115, after generation of the output data 192 and no other queries need to be executed to retrieve the necessary vendor_ids again.

The order resolution engine 195 can proportionally allocate payment to vendor_1 and vendor_7 with 65% of the payment going to vendor_1 and 35% of the payment going to vendor_7. The order resolution engine 195 can then make payment to digital vender wallet (VW) VW1, VW2, VW3, VWn (where n is any positive integer greater than zero and can, in some implementations, be equal to the number of vendors in the locally-sourced product database 150) such as a checking account, electronic wallet, or cryptocurrency wallet for the each of the different vendors such as vendor_1 and vendor_7 based on the aforementioned payment allocation model. The order resolution engine 195 can generate instructions 196 to issue payments to wallets VW1 and VW7 (not depicted but present using ellipses). The API 130 can transmit payments 196a to the wallets VW1 and VW7 based on the instructions 196 from the order resolution engine 195. Payments 196a can be made in a number of different ways including ACH transfer, wire transfer, transfer of cryptocurrency to an account or wallet of sender, or the like.

While this example includes data describing a particular order resolution engine 195 to compensate vendors, the present disclosure does not necessarily require an order resolution engine 195. Instead, the order fulfillment engines can be used to fulfill a request for locally-sourced products and a $3^{rd}$ party payment processor can allocate the funds to each respective vendor.

Figure 2:
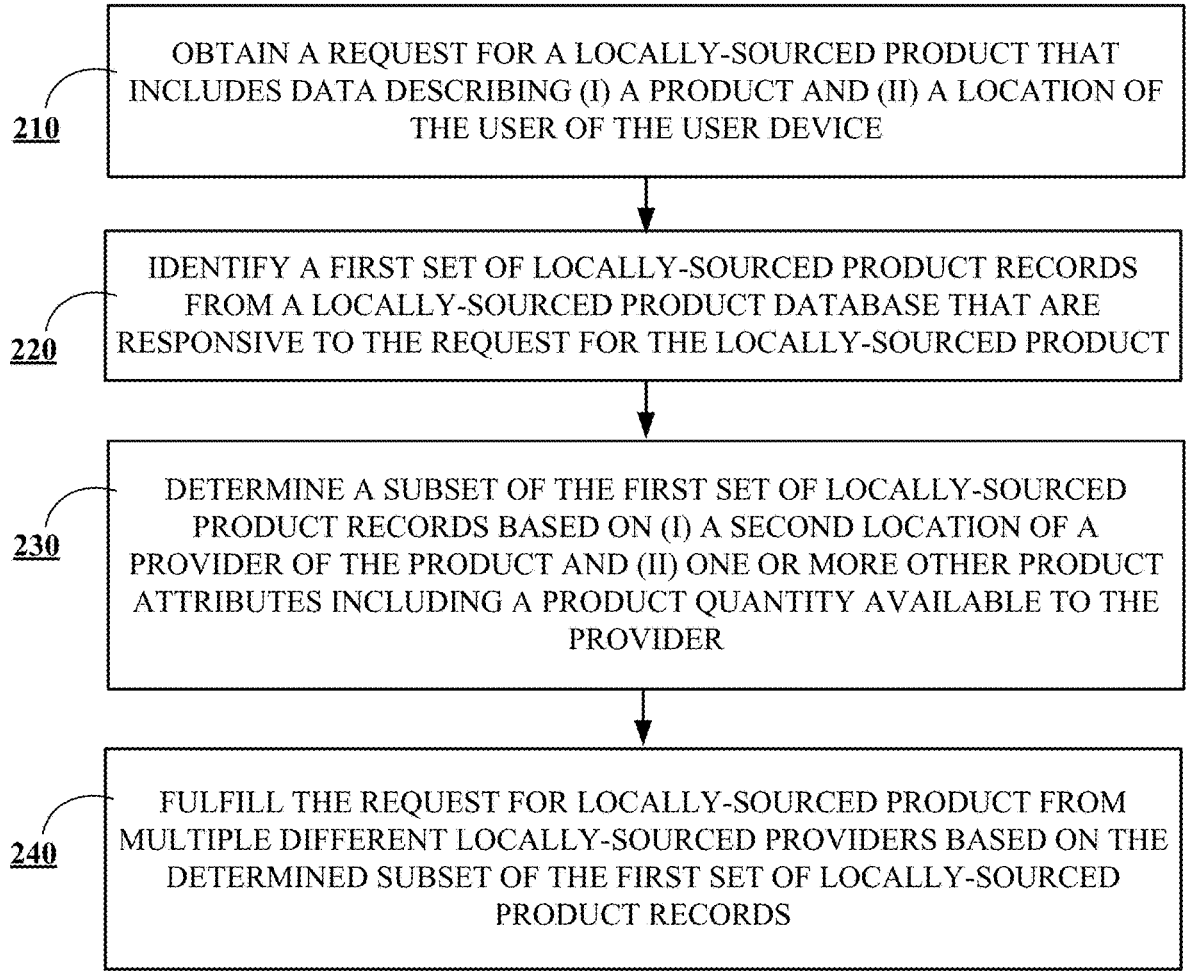
FIG. 2 is a flowchart of an example of a process for satisfying a request for locally-sourced products

FIG. 2 is a flowchart of an example of a process 200 for satisfying a request for locally-sourced products. In some implementations, the process 200 can include execution of one or more operations by a system of one or more computers such as the system 100 of FIG. 1. By way of example, a system can begin performance of the process 200 at stage 210 by using one or more computers to obtain, from a user device, a request for a locally-sourced product that includes data describing (i) a product and (ii) a location of the user of the user device (210). In some implementations, the data describing the product can include data identifying a product, product quantity, or any combination thereof. In some implementations, the request for locally-source products can include data that request freshly harvested products from a locally-sourced provider. In some implementations, the location of the user of the user device can be determined using the location of the user device. In other implementations, the user can input a location for the user.

The system can continue execution of the process 200 at stage 220 by using one or more computers to identify a first set of locally-sourced product records from a locally-sourced product database that are responsive to the request for the locally-sourced product. In some implementations, the system can generate a query based on the request for locally-sourced products received at stage 210 and then execute the generated query against the locally-sourced product database in order to identify the first set of locally-sourced product records.

The system can continue execution of the process 200 at stage 230 by using one or more computers to determine a subset of the first set of locally-sourced product records based on (I) a second location of a provider of the product and (II) one or more other product attributes including a product quantity available to the provider. In some implementations, a product quantity available to the locally-sourced provider can include an amount of harvested product, an amount of product that has not been harvested, or a combination of both.

The system can continue execution of the process 200 at stage 240 by using one or more computers to fulfill the request for locally-sourced product from multiple different locally-sourced providers based on the determined subset of the first set of locally-sourced product records. This can include, for example, they system using one or more computers to identify a first locally-sourced provider record from the subset of the first set of locally-sourced product records having a first locally-sourced provider location closest in proximity to the location of the user and then the system using locally-sourced product inventory of the first locally-sourced provider associated with the identified locally-sourced provider record to fulfill the request for the locally-sourced product until (i) the locally-sourced product inventory of the first locally-sourced provider is exhausted or (ii) a quantity of locally-sourced product requested by the request is satisfied.

In some implementations, the locally-sourced provider may be determined to have a sufficient quantity of product available if the provider has the requisite amount of harvested product. In other implementations, the locally-sourced provider may be determined to have a sufficient quantity of product available if the provider has a requisite total of combined harvested and pre-harvested product. If a quantity of pre-harvest product is used, the system can generate a notification and transmit the notification to a computer of the locally-sourced provider that triggers one or more operations necessary to begin harvest of the pre-harvest product. Such operation can include, for example, alerting a computer of a locally-sourced provider of the requisite amount of product necessary to achieve the requisite quantity of product to satisfy the required quantity or even instructing a robotic device to begin harvest of the requisite amount of produce necessary to achieve the requisite quantity of product to satisfy the required quantity.

The process 200 above is described, in generally, as fulfilling the request for locally-sourced products from one or more locally-sourced providers of multiple locally-sourced providers. However, the complete set of "providers" may include locally-sourced providers and one or more providers that are not local to the user. In such implementations, the one or more providers that are not local may be removed from consideration, using the techniques described with reference to the system 100 of FIG. 1, due to the fact that provider is not within a sufficient geographic location of the user that submitted the request at stage 210.

Figure 3:
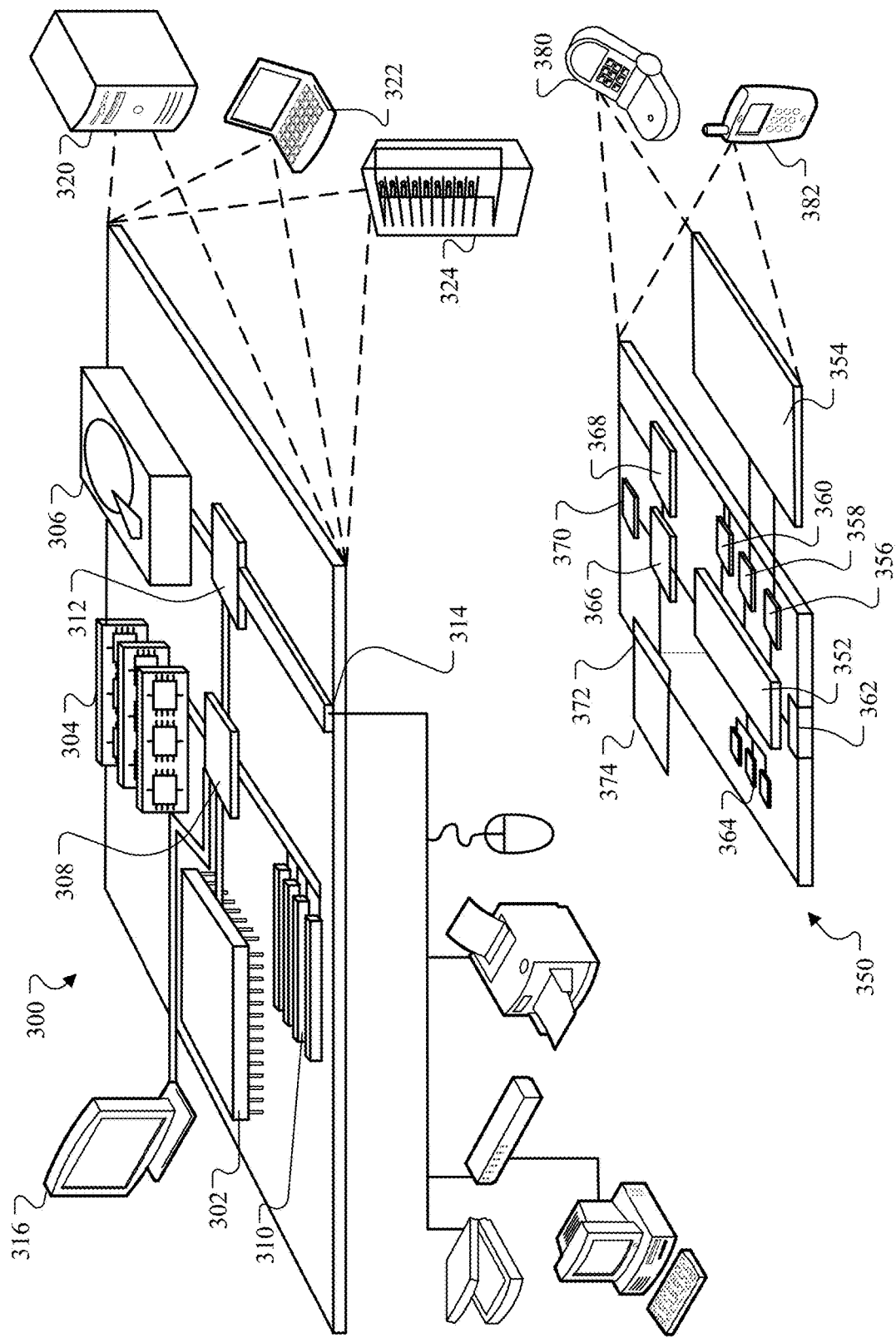
FIG. 3 is a block diagram of system components that can be used to implement a data processing system for satisfying a request for locally-sourced products.

FIG. 3 is a block diagram 300 of system components that can be used to implement a data processing system for satisfying a request for locally-sourced products.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be examples only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 308. Each of the components 302, 304, 306, 308, 310, and 312, are interconnected using various busses, and can be mounted on a common motherboard or in other manners as appropriate. The processor 302 can process instructions for execution within the computing device 300, including instructions stored in the memory 304 or on the storage device 308 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 308 is capable of providing mass storage for the computing device 300. In one implementation, the storage device 308 can be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 308, or memory on processor 302.

The high-speed controller 308 manages bandwidth-intensive operations for the computing device 300, while the low speed controller 312 manages lower bandwidth intensive operations. Such allocation of functions is only an example. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 308 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provided in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can also include secure information. Thus, for example, expansion memory 374 can be provided as a security module for device 350, and can be programmed with instructions that permit secure use of device 350. In addition, secure applications can be provided via the SWIM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

OTHER EMBODIMENTS

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method for satisfying a request for locally-sourced products comprising:
    causing rendering, on a user device, of a graphical user interface with one or more input controls, selection of which causes setting of one or more values of one or more parameters represented in the graphical user interface and transmitting of one or more requests with the one or more set values over one or more networks;
    responsive to the one or more input controls selected, obtaining, by one or more computers and from the user device, the one or more requests (a) for a locally-sourced product that is a perishable item sourced from one or more local growers and (b) that includes data describing (i) the locally sourced-product that is sourced from the one or more local growers and (ii) a location of the user device;
    reading from memory data records of data structures, with each data structure including data parameters corresponding to the locally-sourced product;
    based on comparing the one or more values of the one or more parameters set by the one or more input controls and values of the data parameters of the data structures read from memory, identifying, by one or more computers, a first set of locally-sourced product records from a locally-sourced product database that are responsive to a request for the locally-sourced product from the one or more requests, wherein the memory includes the locally-sourced product database;
    determining, by one or more computers, a subset of the first set of locally-sourced product records based on (i) a second location of a local grower of the product and (ii) one or more other product attributes including a product quantity available to the provider;
    initiating fulfillment, by one or more computers executing a locally-sourced product fulfillment engine that matches the user request for the locally-sourced product to one or more different local growers using the determined subset of the first set of locally-sourced product records, of the request;
    determining, by one or more computers, that a locally-sourced product inventory, including an amount of harvested product and an amount of product available that has not been harvested, of the local grower is exhausted;
    based on a determination that the locally-sourced product inventory of the local grower is exhausted:
        identifying, by one or more computers, a second locally-sourced product record having a location of a second local grower that is a next-closest location to the location of the user device after the location of the local grower of the locally-sourced provider record; and
        using, by one or more computers, locally-sourced product inventory of the second local grower associated with the identified second locally-sourced provider record to fulfill the request for the locally-sourced product until (i) the locally-sourced product inventory of the second local grower is exhausted or (ii) a quantity of locally-sourced product requested by the request is satisfied; and
    facilitating, by one or more computers, the transfer of the locally-sourced product between the one or more local growers of the product and the requester at one or more pick-up locations.

2. The method of claim 1, wherein determining a subset of the first set of locally-sourced product records based on (i) a second location of a local grower of the product and (ii) one or more other product attributes including a product quantity available to the provider comprises:
    identifying, by one or more computers, a particular subset of locally-sourced product records that each include one or more fields structuring data that represents (i) a second location of the local grower of the product that is within a predetermined distance of the location of the user device and (ii) a quantity of the product that is greater than zero.

3. The method of claim 1,
    wherein the request for the locally-sourced product further includes a collection availability to collect the locally-sourced product,
    wherein the one or more other product attributes also includes a provision availability to provide the locally-sourced product, and
    wherein determining the subset of the first set of records based on (i) a second location of a local grower of the product and (ii) one or more other product attributes comprises:
        identifying, by one or more computers, a particular subset or locally-sourced provider records that each include one or more fields structuring data representing (i) a second location of the local grower of the product that is within a predetermined distance of the location of the user device, (ii) a quantity of the product that is greater than zero, and (iii) a provision availability that corresponds to the collection availability.

4. The method of claim 1, wherein the transfer is facilitated at the pick-up location, wherein the pick-up location includes a pick-up location when indicated or a delivery location when indicated.

5. The method of claim 1, comprising:
   detecting, for a pickup location, an initial reporting of a second product;
   determining that the locally-sourced product database does not include a record for the second product;
   generating, in the locally-sourced product database, a new record for the second product at the pickup location;
   receiving a data request for entry of a record in the locally-sourced product database for the second product at the pickup location;
   determining that the locally-sourced product database includes the new record for the second product at the pickup location; and
   in response to determining that the locally-sourced product database includes the new record for the second product at the pickup location, determining to skip creating another record for the second product at the pickup location.

6. The method of claim 1, comprising:
   generating a pre-harvest notification that identifies a quantity of the locally-sourced product for harvesting; and
   transmitting, to a computer, the pre-harvest notification to trigger one or more operations to begin harvest of the quantity of the locally sourced-product.

7. The method of claim 1, wherein the user device comprises a user device of an individual, a person representing a group, or a wholesaler.

8. A system for satisfying a request for locally-sourced products, the system comprising:
   one or more computers and one or more storage devices storing instructions that are operable, when executed by the one or more computers, to cause the one or more computers to perform operations comprising:
   causing rendering, on a user device, of a graphical user interface with one or more input controls, selection of which causes setting of one or more values of one or more parameters represented in the graphical user interface and transmitting of one or more requests with the one or more set values over one or more networks;
   responsive to the one or more input controls selected, obtaining, by one or more computers and from the user device, the one or more requests (a) for a locally-sourced product that is a perishable item sourced from one or more local providers and (b) that includes data describing (i) the locally sourced-product that is sourced from the one or more local providers and (ii) a location of the user device;
   reading from memory data records of data structures, with each data structure including data parameters corresponding to the locally-sourced product;
   based on comparing the one or more values of the one or more parameters set by the one or more input controls and values of the data parameters of the data structures read from memory, identifying, by one or more computers, a first set of locally-sourced product records from a locally-sourced product database that are responsive to a request for the locally-sourced product from the one or more requests, wherein the memory includes the locally-sourced product database;
   determining, by one or more computers, a subset of the first set of locally-sourced product records based on (i) a second location of a provider of the product and (ii) one or more other product attributes including a product quantity available to the provider;
   fulfilling, by one or more computers executing a locally-sourced product fulfillment engine that matches the user request for the locally-sourced product to one or more different local providers using the determined subset of the first set of locally-sourced product records, the request;
   facilitating, by one or more computers, the transaction of the locally-sourced product between the one or more local providers of the product and the requester at one or more pick-up locations;
   detecting, for a pickup location, an initial reporting of a second product;
   determining that the locally-sourced product database does not include a record for the second product;
   generating, in the locally-sourced product database, a new record for the second product at the pickup location;
   receiving a data request for entry of a record in the locally-sourced product database for the second product at the pickup location;
   determining that the locally-sourced product database includes the new record for the second product at the pickup location; and
   in response to determining that the locally-sourced product database includes the new record for the second product at the pickup location, determining to skip creating another record for the second product at the pickup location.

9. The system of claim 8, wherein determining a subset of the first set of locally-sourced product records based on (i) a second location of a local provider of the product and (ii) one or more other product attributes including a product quantity available to the provider comprises:
   identifying, by one or more computers, a particular subset of locally-sourced product records that each include one or more fields structuring data that represents (i) a second location of the local provider of the product that is within a predetermined distance of the location of the user device and (ii) a quantity of the product that is greater than zero.

10. The system of claim 8,
    wherein the request for the locally-sourced product further includes a collection availability to collect the locally-sourced product,
    wherein the one or more other product attributes also includes a provision availability to provide the locally-sourced product, and
    wherein determining the subset of the first set of records based on (i) a second location of a local provider of the product and (ii) one or more other product attributes comprises:
    identifying, by one or more computers, a particular subset or locally-sourced provider records that each include one or more fields structuring data representing (i) a second location of the local provider of the product that is within a predetermined distance of the location of the user of the user device, (ii) a quantity of the product that is greater than zero, and (iii) a provision availability that corresponds to the collection availability.

11. The system of claim 8, wherein fulfilling the request for locally-sourced product from one or more different local providers using the determined subset of first set of locally-sourced product records comprises:
    identifying, by one or more computers, a first locally-sourced provider record from the subset of the first set of locally-sourced product records having a first locally-sourced provider location closest in proximity to the location of the user device; and using, by one or more computers, locally-sourced product inventory of the first locally-sourced provider associated with the identified first locally-sourced provider record to fulfill the request for the locally-sourced product until (i) the locally-sourced product inventory of the first local provider is exhausted or (ii) a quantity of locally-sourced product requested by the request is satisfied.

12. The system of claim 8, the operations further comprising:

determining, by one or more computers and during fulfillment of the request for the locally-sourced product, that a locally-sourced product inventory of the local provider is exhausted; and based on a determination that the locally-sourced product inventory of the local provider is exhausted:

identifying, by one or more computers and during fulfillment of the request for the locally-sourced product, a second locally-sourced product provider record having a location of a second locally-sourced product provider that is a next-closest location to the location of the user device after the location of the local provider of the locally-sourced provider record; and using, by one or more computers, locally-sourced product inventory of the second local provider associated with the identified second locally-sourced provider record to fulfill the request for the locally-sourced product until (i) the locally-sourced product inventory of the second local provider is exhausted or (ii) a quantity of locally-sourced product requested by the request is satisfied.

13. The system of claim 8, wherein the operations further comprise facilitating the transaction at the pick-up location, wherein the pick-up location includes a pick-up location when indicated or a delivery location when indicated.

14. A non-transitory computer-readable medium storing software comprising instructions executable by one or more processors which, upon such execution, cause the one or more processors to perform operations comprising:

causing rendering, on a user device, of a graphical user interface with one or more input controls, selection of which causes setting of one or more values of one or more parameters represented in the graphical user interface and transmitting of one or more requests with the one or more set values over one or more networks;

responsive to the one or more input controls selected, obtaining, by one or more computers and from the user device, the one or more requests (a) for a locally-sourced product that is a perishable item sourced from one or more locally-sourced providers and (b) that includes data describing (i) the locally sourced-product that is sourced from the one or more locally-sourced providers and (ii) a location of the user of the user device;

reading from memory data records of data structures, with each data structure including data parameters corresponding to the locally-sourced product;

based on comparing the one or more values of the one or more parameters set by the one or more input controls and values of the data parameters of the data structures read from memory, identifying, by one or more computers, a first set of locally-sourced product records from a locally-sourced product database that are responsive to a request for the locally-sourced product from the one or more requests, wherein the memory includes the locally-sourced product database;

determining, by one or more computers, a subset of the first set of locally-sourced product records based on (i) a second location of a locally-sourced provider of the product and (ii) one or more other product attributes including a product quantity available to the provider;

fulfilling, by one or more computers executing a locally-sourced product fulfillment engine that matches the user request for the locally-sourced product to one or more different locally-sourced providers based on the determined subset of the first set of locally-sourced product records, of the request, the fulfilling comprising:

determining, by one or more computers and during fulfillment of the request for the locally-sourced product, that a locally-sourced product inventory of the locally-sourced provider is exhausted; and based on a determination that the locally-sourced product inventory of the locally-sourced provider is exhausted during fulfillment of the request:

identifying, by one or more computers and during fulfillment of the request for the locally-sourced product, a second locally-sourced product provider record having a location of a second locally-sourced product provider that is a next-closest location to the location of the user device after the location of the locally-sourced product provider of the locally-sourced provider record; and using, by one or more computers and during fulfillment of the request for the locally-sourced product, locally-sourced product inventory of the locally-sourced provider associated with the identified second locally-sourced provider record to fulfill the request for the locally-sourced product until (i) the locally-sourced product inventory of the second locally-sourced provider is exhausted or (ii) a quantity of locally-sourced product requested by the request is satisfied; and facilitating, by one or more computers, the transaction of the locally-sourced product between the one or more providers of the product and the requester at one or more pick-up locations.

15. The non-transitory computer-readable medium of claim 14, wherein determining a subset of the first set of locally-sourced product records based on (i) a second location of a locally-sourced provider of the product and (ii) one or more other product attributes including a product quantity available to the provider comprises:

identifying, by one or more computers, a particular subset of locally-sourced product records that each include one or more fields structuring data that represents (i) a second location of the locally-sourced provider of the product that is within a predetermined distance of the location of the user of the user device and (ii) a quantity of the product that is greater than zero.

16. The non-transitory computer-readable medium of claim 14, wherein the request for the locally-sourced product further includes a collection availability to collect the locally-sourced product, wherein the one or more other product attributes also includes a provision availability to provide the locally-sourced product, and wherein determining the subset of the first set of records based on (i) a second location of a locally-sourced provider of the product and (ii) one or more other product attributes comprises:

identifying, by one or more computers, a particular subset or locally-sourced provider records that each include one or more fields structuring data representing (i) a second location of the locally-sourced provider of the product that is within a predetermined distance of the location of the user of the user device, (ii) a quantity of the product that is greater than zero, and (iii) a provision availability that corresponds to the collection availability.

17. The non-transitory computer-readable medium of claim 14, wherein the operations further comprise facilitating the transaction at the pick-up location, wherein the pick-up location includes a pick-up location when indicated or a delivery location when indicated.

18. The non-transitory computer-readable medium of claim 14, the operations comprising:

detecting, for a pickup location, an initial reporting of a second product;

determining that the locally-sourced product database does not include a record for the second product;

generating, in the locally-sourced product database, a new record for the second product at the pickup location;

receiving a data request for entry of a record in the locally-sourced product database for the second product at the pickup location;

determining that the locally-sourced product database includes the new record for the second product at the pickup location; and in response to determining that the locally-sourced product database includes the new record for the second product at the pickup location, determining to skip creating another record for the second product at the pickup location.

* * * * *